US007259207B2

(12) United States Patent
Gruenewaelder et al.

(10) Patent No.: US 7,259,207 B2
(45) Date of Patent: Aug. 21, 2007

(54) SINGLE-COMPONENT POLYURETHANE ADHESIVE

(75) Inventors: Bernhard Gruenewaelder, Hilden (DE); Bernhard Schoettmer, Monheim (DE); Werner Haller, Erkrath (DE); Wolfgang Klauck, Meerbusch (DE); Birgit Ness, Langenfeld (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/276,928

(22) PCT Filed: May 15, 2001

(86) PCT No.: PCT/EP01/05498

§ 371 (c)(1),
(2), (4) Date: Nov. 20, 2002

(87) PCT Pub. No.: WO01/90271

PCT Pub. Date: Nov. 29, 2001

(65) Prior Publication Data

US 2003/0130413 A1 Jul. 10, 2003

(30) Foreign Application Priority Data

May 23, 2000 (DE) ................. 100 25 528

(51) Int. Cl.
C08J 3/00 (2006.01)
C08K 3/20 (2006.01)
C08K 3/34 (2006.01)
C08L 75/00 (2006.01)
C09J 4/00 (2006.01)

(52) U.S. Cl. ..................... 524/590; 156/60; 156/330.9; 156/331.4; 156/331.7; 524/492; 524/493; 524/589

(58) Field of Classification Search ............... 524/589, 524/590, 492, 493; 156/60, 330.9, 331.4, 156/331.7
See application file for complete search history.

(56) References Cited

U.S. PATENT DOCUMENTS 5,110,892 A 5/1992 Graham

FOREIGN PATENT DOCUMENTS

| DE | 23 65 623 | 8/1975 |
| EP | 0 172 337 | 2/1966 |
| EP | 0 369 607 | 5/1990 |
| EP | 0 386 879 | 9/1990 |

OTHER PUBLICATIONS

Plastics-Resins in the liquid state or as emulsions or dispersions-Determination of apparent viscosity by the Brookfield Test Method, (ISO 2555), $2^{nd}$ Edition, pp. 1-7 (1989).
Building construction; jointing products; determination of extrudability of sealants using standardized apparatus, European Standard, (DIN EN 29 048) (1991).
Building construction; jointing products; determination of resistance to flow, European Standard, (DIN EN 27 390) (1991).
Evaluation of non-structural adhesives for joining of wood and derived timber products, European Standard, (DIN EN 204) (1991).
Wood Adhesives Temperature Test, Technische Kommission Holzklebstoffe im Fachverband Klebstoffindustrie e.V., Dusseldorf, (WATT 91) (1991).
Test Methods for wood adhesives for non-structural applications; determination of tensile sh strength of lap joints, European Standard, (DIN EN 205) (1991).
Adhesives-Determination of isocyanate content, European Standard, (pr En 1242), pp. 1-5, (1997).
"Desmodur® VKP 58" Product Sheet, Bayer MaterialScience, Edition Oct. 22, 2004 (Coatings, Adhesives & Sealants), pp. 1-3.

*Primary Examiner*—Patrick Niland
(74) *Attorney, Agent, or Firm*—Stephen D. Harper; Glenn E. J. Murphy

(57) ABSTRACT

A pasty single component polyurethane adhesive is provided. The NCO terminated polyurethane prepolymer is substantially linear, contains from 2.0% to 8.0% based on the weight of the prepolymer, of highly disperse silica and up to 10% by weight, based on the weight of the prepolymer, of additives. The one component adhesive has an Expressed Volume of at least 2,000 g/min measured according to DIN EN 29048 and a Creep Resistance measure according to DIN EN 27390 below 6.0 after 5 minutes.

14 Claims, No Drawings

SINGLE-COMPONENT POLYURETHANE ADHESIVE

RELATED APPLICATIONS

This application is filed under 35 U.S.C. 371(c) claiming priority of PCT/EP01/05498 filed May 15, 2001 which claims priority from DE 100 25 528.0 filed May 23, 2000, the contents of each application are incorporated herein by reference.

FIELD OF THE INVENTION

This invention relates to a 1-component polyurethane adhesive (1-C PU adhesive) based on at least one NCO-terminated PU prepolymer and at least one thickener and optionally additives. The present invention also relates to the production of this 1-C PU adhesive and to its use.

BACKGROUND OF THE INVENTION

1-C PU adhesives are known. DE 23 65 623 describes a liquid polyfunctional polisocyanate precondensate with an NCO content of 2 to 15% by weight for bonding wet wood. Additives such as, for example, dyes, solvent, water and foam control agents may be added to the PU precondensate. Above all, fillers may also be added to improve processability, for example to increase viscosity, to impart thixotropic properties, to prevent penetration into the wood, to increase provisional adhesion during prepressing and the like. The many fillers actually mentioned include inter alia colloidal silicon dioxide and silica gel powder. Wood meal above all is used in the Examples. Although 15 to 25% by weight of such fillers are added, the adhesives are liquid and tend to drip, albeit to a lesser extent than without the added filler (see page 15, bottom).

From this emerges the problem addressed by the present invention, namely to provide a 1-C PU adhesive with such particular rheological properties that, on the one hand, it would be sufficiently flowable to be expressed from pressurized containers or cartridges, for example, but on the other hand would show satisfactory creep resistance and would not drip or flow down vertical surfaces. The adhesive properties typical of a structural and assembly adhesive would of course remain intact.

BRIEF DESCRIPTION OF THE INVENTION

The solution to this problem is defined in the claims and consists essentially in using linear PU prepolymers instead of branched or even crosslinked PU prepolymers and highly disperse silica as thickener.

Accordingly, the present invention relates to a paste-form 1-component polyurethane adhesive (1-C PU adhesive) based on at least one NCO-terminated PU prepolymer and at least one thickener and optionally at least one additive, A) the NCO-terminated PU prepolymer being substantially linear and B) the thickener being a highly disperse silica in a concentration of 2.0 to 8.0% by weight, based on the prepolymer, and C) less than 10% by weight, based on the prepolymer, being present as additive.

DETAILED DESCRIPTION OF THE INVENTION

Paste-form in the context of the invention refers generally to a substance of dough-like consistency which has a viscosity of 20 to 100 Pas at room temperature (23°), as measured to RTV ISO 2555. In addition, the 1-C PU adhesive according to the invention shows special rheological behavior: its expressed volume as measured to DIN EN 29048 is greater than 2,000, preferably greater than 2,300 and more particularly greater than 2,600 g/min. at 23° C. Despite this large expressed volume, creep resistance is sufficiently high for a structural and assembly adhesive, measuring less than 6.0, preferably less than 4.0 and more particularly less than 2.0 g after 5 mins. (DIN EN 27390).

A pre-requisite for this special rheological behavior is that the PU prepolymer should be substantially linear. To this end, the average functionality of both the polyol component and the polyisocyanate component should be less than 2.15, preferably les than 2.10 and more particularly less than 2.0.

The polyol component for the production of the PU prepolymer should consist of at least one polyol. Suitable polyols include polyester polyols, for example the polyester Desmophen 1700 of adipic acid and diethylene glycol (Bayer), polyester PE 231 of adipic acid, isophthalic acid and diethylene glycol (Henkel) and polyester PE 218 of adipic acid, isophthalic acid, propylene glycol and diethylene glycol (Henkel), and polyether polyols, for example polyethylene glycol and polypropylene glycol.

The polyols should have a molecular weight of 200 to 8,000, preferably in the range from 600 to 4,000 and more particularly in the range from 1,000 to 3,000 g/mol.

The polyisocyanate component for the production of the PU prepolymer should contain at least one polyisocyanate. It may be both aliphatic and cycloaliphatic and, in particular, aromatic. Preferred isocyanates are MDI, IPDI, TDI and TMXDI.

The percentage content of the polyol component and the polyisocyanate component is defined by the equivalence ratio of the NCO groups and the OH groups. The NCO/OH equivalence ratio should be in the range from 3.5 to 7.5 and is preferably in the range from 4.0 to 6.0 and more particularly in the range from 4.5 to 5.5.

Depending on the excess of NCO groups over OH groups, the NCO content is in the range from 7.0 to 15.0% by weight and preferably in the range from 10 to 15% by weight, based on the prepolymer.

The Brookfield viscosity of the PU prepolymer at 23° C. should be in the range from 500 to 12,000 and is preferably in the range from 1,000 to 6,000 and more particularly in the range from 1,500 to 3,500 mPas.

The PU prepolymer is prepared in known manner and is preferably free from solvents and water. The reaction conditions, more particularly the catalysts and temperatures, should also be selected so that no branching occurs.

The thickener is intended to ensure plastic flow behavior. In other words, up to moduli below the yield point, the PU adhesive behaves like a solid and, for example, is elastically deformable as such. The PU adhesive only flows when the shear stress exceeds a certain value (yield point). The shear rate then increases with the shear stress reduced by the yield point. However, the change in viscosity dependent on the shear rate should be independent of the shear time so that the viscosity returns to its original value with vitually no rest time when the shear stress is removed. A thickener which meets these requirements is highly disperse silica added in a quantity of ca. 2 to 8, above all 3 to 7 and more particularly 4 to 6% by weight, based on the prepolymer. Highly disperse silica in the context of the present invention is understood in particular to be a pyrogenic silica produced by flame hydrolysis. The highly disperse silica should be predominantly hydrophobic. This is the case when it is wetted only by a mixture of methanol and water with a percentage methanol content of 50% by volume.

Fillers are different from these thickeners which determine the rheology of the adhesive. Their main purpose is to increase the volume and/or the weight. However, they can also improve performance behavior, for example by reducing shrinkage or influencing hardness, strength and elasticity. However, they can also act as colorants. Fillers such as these (either powders or fibers) include, above all, carbonates, more particularly calcium carbonate, and silicates, especially talcum, clay and mica, and sulfates, more particularly calcium and barium sulfate, and aluminium hydroxide, glass and carbon blacks. Besides these inorganic materials, organic materials may also be used, including for example wood, bark or cereal flour and cellulose, pulp or rice shell powder or powder-form cotton linters or synthetic fibers, for example of polyethylene or polyacrylonitrile. However, substances such as these are present in the 1-C PU adhesive according to the invention in quantities outside the range typical of fillers of more than 20% by weight, more particularly in quantities of less than 10% by weight and above all in quantities of less than 5% by weight. In a preferred embodiment, substances with such functions are not present at all in the 1-C PU adhesive according to the invention.

For certain purposes, for example in order to improve the production, storage or use of the PU adhesive, additives may be added in small quantities of 0 to 2% by weight and preferably 0.1 to 1.0% by weight, based on the PU prepolymer. Such additives include, for example, defoamers, wetting agents, stabilizers, foam catalysts, more particularly catalysts, specifically dimorpholinodiethyl ether, N-methyl morpholine, N-ethyl morpholine and N,N,N',N'-tetramethyl-2,2'-oxybis(ethylamine).

The 1-C PU adhesive is predominantly free from solvents. However, it may contain up to 5% by weight and more particularly up to 2.5% by weight of solvents, for example to influence Theological behavior, foam behavior or the open or processing time. A solvent in the context of the present invention is an inert substance which is liquid at room temperature and which boils at up to 200° C. at normal pressure. Typical solvents are ethers, esters, ketones and aliphatic, cycloaliphatic or aromatic hydrocarbons.

The 1-C PU adhesive is also predominantly free from plasticizers. However, plasticizers may be present in a quantity of up to 5% by weight, based on the prepolymer.

In addition, the 1-C PU adhesive is predominantly free from water although up to 1% by weight, based on the prepolymer, may be present.

The 1-C PU adhesives according to the invention are prepared from the above-mentioned components by mixing and homogenizing. This is generally done at room temperature or at 15 to 50° C. and preferably at 20 to 35° C. An inert gas has to be used because of the isocyanates The 1-C PU adhesives according to the invention show advantages over known 1-C PU adhesives by virtue above all of their rheological behavior. They combine a high expressed volume, as measured to DIN EN 29048, with high creep resistance as measured to DIN EN 27390. These properties enable the adhesive to be used as a creep-resistant structural and assembly adhesive through simple application from pressurized containers or cartridges or other sealed containers where the adhesive passes outwards through a narrow opening. By virtue of their creamy paste-like consistency, the adhesives according to the invention are also easy to spread over relatively large areas. The PU adhesives according to the invention are also distinguished by high water resistance, as measured to DIN EN 204. Thus, the requirements of stress group D4 according to DIN EN 204, storage sequence 5, are satisfied with a value of greater than 4.0 N/mm². Heat resistance, as measured to WATT 91, is also sufficiently high at >7.0 N/mm² to cover the field of window and door construction and hence to allow outdoor use of the adhesive.

In addition, the adhesive also shows the typical properties of a structural or assembly adhesive. It can be used for highly stressed bonds which, after curing, contribute significantly towards strengthening bonded substrates. By virtue of its relatively high initial adhesion and its high creep resistance, the 1-C PU adhesive according to the invention is also eminently suitable for the assembly of objects. The adhesive according to the invention is also suitable for a large number of different materials. Thus, wood and wood-based materials can be bonded to one another. The wood-based materials are products obtained by reducing the wood to pieces and then joining it together, generally with other materials, for example plywood, chipboard or fiber board. However, wood and wood-based materials in combination with, for example, metals, such as aluminium, copper, lead, steel, zinc, or with plastics, for example glass-fiber-reinforced plastics (GFP), PVC, polystyrene, melamine, HPL, or with materials of mineral origin, for example plaster board, ceramic, marble, concrete, screed and bricks, are also possible. Materials such as these are durably bonded in a flexible, heat- and water-resistant manner.

The invention is illustrated by the following Examples.

EXAMPLES

I. Starting Materials
1. Lupranol 1000, polypropylene glycol, OHV ca. 55 (Elastorgran BASF)
2. Lupranol 1100, polypropylene glycol, OHV ca. 110 (Elastorgran BASF)
3. Desmodur M 44, 4,4'-diphenylmethane diisocyanate, NCO content ca. 33% (Bayer)
4. Desmodur VKS 20 F, 4,4'-diphenylmethane diisocyanate with polymeric components, NCO content ca. 31% (Bayer)
5. Aerosil R 202, hydrophobic highly disperse silica (Degussa)
6. Irgastab-DBTL, dibutyl tin dilaurate (Witco)
7. Dabco DMDEE, 2,2'-dimorpholinodiethyl ether (Air Products)

II. Production of the Prepolymers

The starting materials were used in the quantities shown in Table I. In the interests of better comparability, the ratio of Lupranol 1000 to Luporanol 1100 was kept substantially the same (3.42:1.00) in all the prepolymers produced. In addition, prepolymers A, B and C were prepolymerized with substantially the same NCO content and substantially the same NCO:OH ratio.

The polyols mentioned were freed from water at 70° C./15 mbar in a laboratory dissolver (PC Laborsystem Dissolver, type LDV 1, Series No. 112-99, manufacturer: PC Laborsystem GmbH) at 200 r.p.m. To monitor the water content, water determination was then carried out by the Karl Fischer method. The polyols contained les than 400 ppm of water.

After cooling to 50° C., the isocyanate was added with stirring and the temperature was increased to 60° C. under normal pressure at 200 r.p.m. in an inert gas atmosphere. The catalyst was then added and prepolymerization was continued at 200 r.p.m./normal pressure in an inert gas atmosphere. An exothermic reaction increased the temperature to ca. 95° C. After about 10 mins., the NCO content was determined. When the theoretical NCO content was reached with an accuracy of ±0.4%, the reaction mixture was cooled under the same stirring conditions, followed by evacuation for ca. 10 mins. at 10 mbar. An inert gas was used for venting.

For characterization of the prepolymers by NCO content and viscosity, see Table I.

III. Production of the Adhesives 100 parts by weight (pbw) of the prepolymer were introduced into the PC Labor Dissolver at 23° C. and the quantity of silica shown in Table II was added. The silica was incorporated over a period of 5 mins. under normal pressure in an inert gas atmosphere, the speed of the dissolver being continuously increased from 250 r.p.m. to 1350 r.p.m. over that period. The temperature of the mixture rose to ca. 27° C. When the silica had been uniformly incorporated, a vacuum of at least 15 mbar was applied for at least 10 mins. at the same dissolver speed, the temperature rising to ca. 32° C. After production, the dissolver was vented with an inert gas. The adhesives were tested at the earliest after 24 h at 23° C. The results are set out in Table II.

In the preparation of the "Example" mixtures, the addition of a foam catalyst was intentionally avoided because otherwise evaluation of creep resistance over a prolonged period would not have been possible because flow behavior would have resulted in earlier skin formation and hence would have influenced creep resisitance as a result of the earlier onset of the reaction between the adhesive and atmospheric moisture. To evaluate water and heat resistance in Example 1, a typical quantity of a typical foam catalyst (0.3% DMDEE) was added to the mixture.

IV. Tests
1) Watt 91: test for wood adhesives for non-load-bearing structural components. Determination of the bond strength of longitudinal bonds by tensile testing under heat (generally accepted test).
2) DIN EN 204: evaluation of adhesives for non-load-bearing structural components for bonding wood and wood-based materials, German version of EN 204 of 1991. Stress Group D4, No. 5, which requires a minimum value of 4 N/mm$^2$, was used as the basis. The test specimens were produced in accordance with DIN EN 205. Determination of the bond strength of longitudinal bonds by tensile testing, July 1997 Edition.
3) Viscosities RTV ISO 2555, Brookfield RTV-DVII, 23° C., spindle 6/20 for prepolymers and spindle 7/20 for the adhesive.
4) DIN EN 29048: determination of the processability of adhesives using standardized equipment (ISO 9048: 1987), German version of EN 29048: 1990. Test conditions: perforated plate d=4 mm, test temperature 23° C., expressed volume in g/min.
5) DIN EN 27390: determination of creep resistance (ISO 7390: 1987). German version of EN 27390: 1990. Creep resistance was determined in accordance with DIN EN 27390 with the following modifications: the strip of polyethylene film was not used. The test was conducted at 23° C., The adhesive was tested hanging from the U-profile. The quantity of adhesive which had either dripped or run from the profile or the quantity of adhesive which had formed a drop was measured.
6) Determination of the isocyanate content to prEN 1242 of September 1997.
7) Determination of the water content by Karl Fischer's method.

V. Results

The Examples show that, with increasing functionality of the polyisocyanate (from 2.0 to 2.7) in the sequence of the prepolymers (A>B>C>D),
a) the expressed volume of the 1-C PU adhesive decreases significantly (from 2.7 to 0.9, despite substantially the same viscosity) and
b) creep resistance also decreases (i.e. the measured value increases from 1.2 to 9.3).

TABLE I

| | prepolymers | | | |
|---|---|---|---|---|
| Prepolymer | A | B | C | D |
| I. Components [% by weight] | | | | |
| Lupranol 1000 | 43.16 | 42.51 | 42.86 | 33.22 |
| Lupranol 1100 | 12.63 | 12.44 | 12.54 | 9.68 |
| Desmodur M 44 | 44.11 | 22.00 | 33.50 | 0 |
| Desmodur VKS 20F | 0 | 22.95 | 11.00 | 57.00 |
| Irgastab-DBTL | 0.10 | 0.10 | 0.10 | 0.10 |
| II. Properties | | | | |
| Average functionality | | | | |
| a) of the polyol mixture | ca. 2.0 | ca. 2.0 | ca. 2.0 | ca. 2.0 |
| b) of the isocyanate | ca. 2.0 | ca. 2.36 | ca. 2.17 | ca. 2.7 |
| NCO/OH ratio | 5.17 | 5.18 | 5.17 | 8.16 |
| NCO content [% by weight] | 11.74 | 11.60 | 11.67 | 15.5 |
| viscosity [Pas] Brookfield, 23° C., #6/20 | 2.7 | 8.3 | 4.25 | 12.00 |

TABLE II

| | adhesives | | | | | |
|---|---|---|---|---|---|---|
| Adhesive | 1 | 2 | 3 | 4 | 5 | 6 |
| I. Components | | | | | | |
| Prepolymer, type | A | A | B | B | C | D |
| pbw | 100 | 100 | 100 | 100 | 100 | 100 |
| Aerosil R 202 pbw | 5.3 | 6.3 | 5.3 | 4.2 | 4.8 | 4.4 |
| II. Properties | | | | | | |
| Brookfield viscosity [Pas] at 23° C., #7/20 | 59 | 85 | 83 | 61 | 63 | 85.5 |
| Expressed volume [kg/min] DIN EN 29048 | 2.7 | 2.6 | 1.1 | 1.3 | 2.0 | 0.9 |
| Creep resistance DIN EN 27390 | | | | | | |
| a) after 5 mins. [g] | 1.2 | 0.6 | 1.0 | 12 | 7.6 | 9.3 |
| b) after 60 mins. [g] | 4.5 | 2.2 | 1.7 | 14 | 13 | 13 |
| Heat resistance [N/mm$^2$] Watt 91 | 8.5 | — | — | — | — | — |
| Water resistance [N/mm$^2$] EN 204 D4, No. 5 | 6.1 | — | — | — | — | — |

We claim:

1. A one-component polyurethane adhesive (1-C PU adhesive) comprising at least one NCO-terminated PU prepolymer; at least one thickener and optionally at least one additive; wherein:

(A) the NCO-terminated PU prepolymer is substantially linear;

(B) the thickener comprises a highly disperse silica in a concentration of 2.0 to 8.0% by weight, based on the prepolymer;
(C) the additive is present at less than 10% by weight, based on the prepolymer; and
(D) the one component polyurethane adhesive is paste form and has an Expressed Volume as measured according to DIN EN 29048, greater than 2,000 g/min. at 23° C. and a Creep Resistance as measured according to DIN EN 27390 below 6.0 after 5 mins; and
(E) the NCO-terminated PU prepolymer has a viscosity at 23° C. of 500 to 3500 mPas.

2. The 1-C Pu adhesive as claimed in claim 1, wherein the substantially linear NCO-terminated PU prepolymer is produced from a polyol component and a polyisocyanate component each with an average functionality of less than 2.15.

3. The 1-C PU adhesive as claimed in claim 2, wherein the polyol component comprises at least one polyol selected from the group consisting of polyester polyols and polyether polyols each with an average molecular weight in the range from 200 to 8,000 g/mol.

4. The 1-C PU adhesive as claimed in claim 1, wherein the substantially linear NCO-terminated PU prepolymers:
a) is prepared from a mixture of a polyol component and a polyisocyanate component in which an equivalent NCO/OH ratio is in a range from 3.5 to 7.5:1; and
b) has an NCO content of 7.0 to 15.0% by weight, based on the prepolymer.

5. The 1-C PU adhesive as claimed in claim 1, wherein the highly disperse silica is hydrophobic.

6. The 1-C PU adhesive as claimed in claim 1 comprising not more than 2% by weight, based on the prepolymer, of additives.

7. The 1-C PU adhesive as claimed in claim 1 in a pressurized container or cartridge.

8. A process for the production of the 1-C PD adhesive claimed in claim 1 which comprises: mixing the substantially linear PU prepolymer and the highly disperse silica and optionally the additives.

9. A method of joining substrates which comprises: applying the adhesive of claim 1 from a cartridge or a pressurized container to a surface of at least one substrate to be joined and pressing the substrates together with the adhesive therebetween.

10. The 1-C PU of claim 1 comprising residues of at least one polyisocyanate selected from the group consisting of MDI, IPDI, TDI and TMXDI.

11. The 1-C PU of claim 3 wherein the polyol has an average molecular weight of from 600 to 4000 g/mol.

12. The paste form 1-C PU adhesive of claim 1 having a viscosity of 20 to 100 Pas at 23° C. as measured according to RTV ISO 2555.

13. The 1-C PU adhesive of claim 2 wherein the average functionality is less than 2.0.

14. The 1C PU adhesive of claim 2 wherein the average functionality is less than 2.10.

* * * * *

UNITED STATES PATENT AND TRADEMARK OFFICE
CERTIFICATE OF CORRECTION

PATENT NO. : 7,259,207 B2
APPLICATION NO. : 10/276928
DATED : August 21, 2007
INVENTOR(S) : Gruenewaelder et al.

It is certified that error appears in the above-identified patent and that said Letters Patent is hereby corrected as shown below:

Title Page, References Cited, FOREIGN PATENT DOCUMENTS, EP 0 172 337, delete "2/1966" and insert therefor --2/1986--.

Column 7
Line 13, delete "Pu" and inset therefor --PU--.
Line 23, delete "prepolymer" and insert therefor --prepolymer--.

Column 8
Line 6, delete "PD" and insert therefor --PU--.
Line 27, delete "1C" and insert therefor --1-C--.

Signed and Sealed this

Twenty-third Day of October, 2007

JON W. DUDAS
*Director of the United States Patent and Trademark Office*